(12) United States Patent
Varaprasad et al.

(10) Patent No.: US 9,061,481 B2
(45) Date of Patent: Jun. 23, 2015

(54) DISPLAY-ON-DEMAND MIRROR WITH OPTIONAL DEFOGGING FEATURE, AND METHOD OF MAKING THE SAME

(71) Applicant: Guardian Industries Corp., Auburn Hills, MI (US)

(72) Inventors: Desaraju V. Varaprasad, Ann Arbor, MI (US); Yiwei Lu, Ann Arbor, MI (US)

(73) Assignee: Guardian Industires Corp., Auburn Hills, MI (US)

( * ) Notice: Subject to any disclaimer, the term of this patent is extended or adjusted under 35 U.S.C. 154(b) by 47 days.

(21) Appl. No.: 13/647,556

(22) Filed: Oct. 9, 2012

(65) Prior Publication Data

US 2013/0025783 A1    Jan. 31, 2013

Related U.S. Application Data

(62) Division of application No. 12/285,514, filed on Oct. 7, 2008, now Pat. No. 8,304,072.

(51) Int. Cl.
*B32B 17/00* (2006.01)
*B32B 17/10* (2006.01)
(Continued)

(52) U.S. Cl.
CPC ....... *B32B 17/10036* (2013.01); *Y10T 428/265* (2015.01); *B32B 17/10174* (2013.01); *B32B 17/10761* (2013.01); *C03C 17/36* (2013.01); *C03C 17/3615* (2013.01);
(Continued)

(58) Field of Classification Search
CPC ........ B32B 15/00; B32B 15/20; B32B 37/00; B32B 37/12; B32B 37/1207; B32B 17/00; B32B 17/12; B32B 17/10009; B32B 17/10018; B32B 17/10082; B32B 17/10165; B32B 17/10174; B32B 17/10201; B32B 17/1022; B32B 17/10816; B32B 17/10871
USPC .............. 156/60, 99, 106; 428/432; 359/608, 359/870; 204/192
See application file for complete search history.

(56) References Cited

U.S. PATENT DOCUMENTS 4,490,227 A * 12/1984 Bitter ....................... 204/192.26
5,668,663 A * 9/1997 Varaprasad et al. .......... 359/608
(Continued)

OTHER PUBLICATIONS

U.S. Appl. No. 12/285,514, filed Oct. 7, 2008; Varaprasad et al.

*Primary Examiner* — Richard Crispino
*Assistant Examiner* — Matthew Hoover
(74) *Attorney, Agent, or Firm* — Nixon & Vanderhye P.C.

(57) ABSTRACT

Certain example embodiments relate to robust semi-transparent coatings that are suitable for use in a wide variety of display-on-demand mirror applications, and methods of making the same. In certain example embodiments, a coated article includes a coating supported by a glass substrate. A reflective metal-inclusive layer is formed, directly or indirectly, on the glass substrate. A silicon oxide inclusive layer is formed, directly or indirectly, on the reflective metallic layer. A titanium oxide inclusive layer is formed, directly or indirectly, on the silicon oxide inclusive layer. The metal-inclusive layer is formed so as to reflect incoming light away from the glass substrate such that substantially less incoming light would be reflected away from the glass substrate if lighting were provided on a side of the glass substrate opposite the coating than if no lighting were provided. The surface of the coated article need not necessarily be conductive. The metal-inclusive layer may be connected to a power source so as to heat it (e.g., for defogging purposes).

8 Claims, 3 Drawing Sheets

(51) Int. Cl.
  *C03C 27/00* (2006.01)
  *G02C 7/00* (2006.01)
  *B29C 65/00* (2006.01)
  *B31B 1/60* (2006.01)
  *B32B 37/00* (2006.01)
  *B32B 15/00* (2006.01)
  *B32B 17/06* (2006.01)
  *G02B 5/08* (2006.01)
  *G02B 17/00* (2006.01)
  *C23C 14/00* (2006.01)
  *C23C 14/32* (2006.01)
  *C03C 17/36* (2006.01)
  *H05B 3/84* (2006.01)

(52) U.S. Cl.
  CPC ........ *C03C 17/3649* (2013.01); *C03C 17/3663* (2013.01); *H05B 3/84* (2013.01)

(56) References Cited

U.S. PATENT DOCUMENTS

| | | |
|---|---|---|
| 5,724,187 A | 3/1998 | Varaprasad et al. |
| 6,690,268 B2 | 2/2004 | Schofield et al. |
| 6,783,253 B2 * | 8/2004 | Thomsen et al. ............. 359/870 |
| 7,184,190 B2 | 2/2007 | McCabe et al. |
| 7,195,381 B2 | 3/2007 | Lynam et al. |
| 7,255,451 B2 | 8/2007 | McCabe et al. |
| 7,274,501 B2 | 9/2007 | McCabe et al. |
| 7,276,289 B2 | 10/2007 | Lu et al. |
| 8,304,072 B2 | 11/2012 | Varaprasad et al. |
| 2006/0050356 A1 | 3/2006 | Varaprasad et al. |
| 2006/0063010 A1 * | 3/2006 | Lu et al. ........................ 428/432 |
| 2007/0243355 A1 | 10/2007 | Scott et al. |
| 2008/0073203 A1 | 3/2008 | Wang et al. |

* cited by examiner

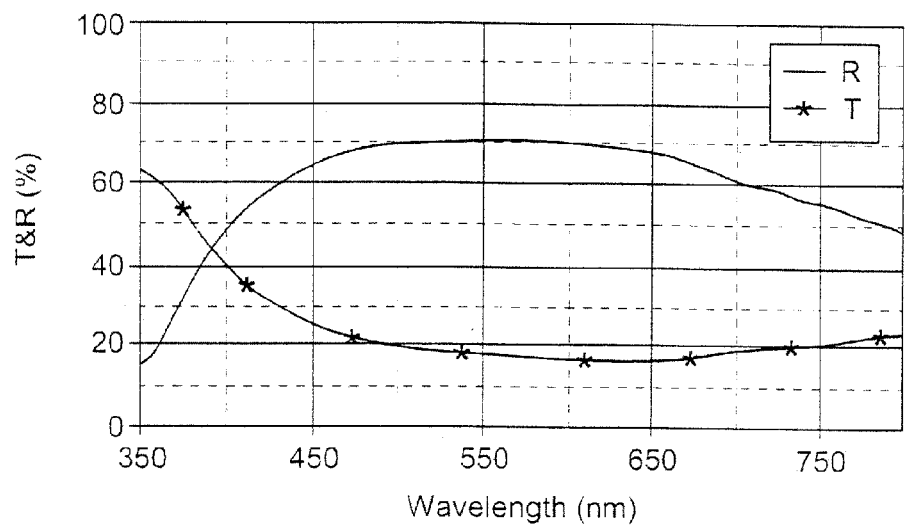
Fig. 5
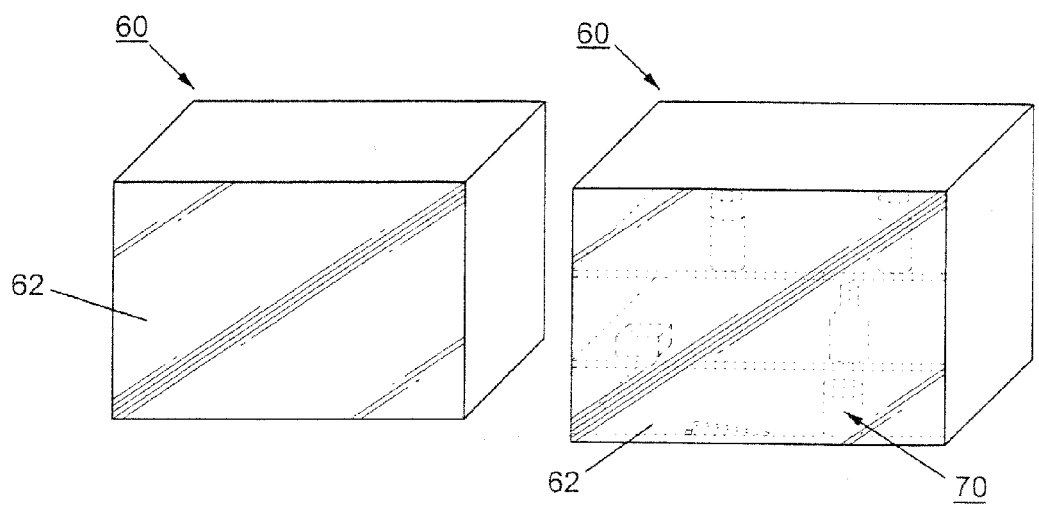
Fig. 6
Fig. 7

DISPLAY-ON-DEMAND MIRROR WITH OPTIONAL DEFOGGING FEATURE, AND METHOD OF MAKING THE SAME

This application is a divisional of application Ser. No. 12/285,514 filed Oct. 7, 2008, the entire disclosure of which is hereby incorporated herein by reference in this application.

FIELD OF THE INVENTION

Certain example embodiments of this invention relate to semi-transparent coatings suitable for use in display-on-demand mirrors, and methods of making the same. More particularly, certain example embodiments relate to more robust semi-transparent coatings that are suitable for use in a wide variety of display-on-demand mirror applications, and methods of making the same. In certain example embodiments, surface conductivity is not necessarily required. In certain example embodiments, a display-on-demand mirror may be defogged, e.g., by heating a thin metal inclusive (e.g., Al or Ag based) layer.

BACKGROUND AND SUMMARY OF EXAMPLE EMBODIMENTS OF THE INVENTION

Display-on-demand mirrors are known in the automotive industry. See, for example, U.S. Pat. Nos. 7,184,190; 7,195,381; 7,255,451; 7,274,501; 6,690,268; 5,724,187; and 5,668,663, the entire contents of each of which is hereby incorporated herein by reference. For example, display-on-demand mirrors have been used in the automotive industry in connection with auto-dimming mirror applications, where the surface electrical conductivity is important. Such auto-dimming mirror applications typically include a semi-transparent silver having protective overcoats.

More particularly, as shown in FIG. 1, which is an example layer stack 10 for a display-on-demand mirror of the kind typically used in connection with auto-dimming automotive mirror applications a very thin layer of metallic silver coating is sandwiched between two thin layers of ITO coatings to produce a semi-transparent and reflective mirror coating of ITO/Ag/ITO. Thus, as shown in FIG. 1, a glass substrate supports a layer of silver 16 sandwiched between first and second layers of indium tin oxide (ITO) 14a and 14b. It will be appreciated that the outer surface 14b is electrically conductive, as it comprises ITO.

In conventional automotive applications, the mirrored surface generally is used in hermetically sealed conditions (e.g., within the context of the auto-dimming mirror). Conventional display-on-demand mirrors thus are substantially protected from the outside environment. Unfortunately, however, such prior art semi-transparent mirror element designs generally are not chemically resilient and readily degrade when they are exposed to the environment. For example, such prior art semi-transparent mirror element designs generally are not chemically resilient and readily degrade when they are implemented outside of a hermitically sealed environment such as that provided by auto-dimming mirrors. Accordingly, such designs are not well suited for many applications. For example, such designs are not well suited for vanity minors often found in bathrooms, or even automotive applications where the auto-dimming mirror does not provide sufficient protection from the outside environment.

Thus, it will be appreciated that there is a need in the art for display-on-demand mirrors that are chemically and/or mechanically durable, and methods of making the same. In this regard, it also will be appreciated that there is a need in the art for coating stacks that comprise chemically and/or mechanically durable semi-transparent reflective substrates.

In certain example embodiments of this invention, a coated article comprising a coating supported by a glass substrate is provided. A reflective metal-inclusive layer is formed, directly or indirectly, on the glass substrate. A silicon oxide inclusive layer is formed, directly or indirectly, on the reflective metallic layer. A titanium oxide inclusive layer is formed, directly or indirectly, on the silicon oxide inclusive layer. The metal-inclusive layer is formed so as to reflect incoming light away from the glass substrate such that substantially less incoming light would be reflected away from the glass substrate if lighting were provided on a side of the glass substrate opposite the coating than if no lighting were provided. The coated article has a sheet resistance of at least about 10 ohms/square. Methods of making the same also are provided.

In certain example embodiments. an apparatus is provided. A coated article comprising a semi-transparent coating supported by a first glass substrate is provided. A reflective metal-inclusive layer comprising Al or Ag is formed, directly or indirectly, on the first glass substrate. A silicon oxide inclusive layer is formed, directly or indirectly, on the reflective metallic layer. A titanium oxide inclusive layer is formed, directly or indirectly, on the silicon oxide inclusive layer. A second glass substrate is provided. A polymer-based interlayer laminates together the first and second glass substrates such that the coating is provided between the first and second glass substrates. The metal-inclusive layer is formed so as to reflect incoming light away from the first glass substrate such that substantially less incoming light would be reflected away from the first glass substrate if lighting were provided on a side of the first glass substrate opposite the coating than if no lighting were provided. The coated article has a sheet resistance of at least about 10 ohms/square. Methods of making the same also are provided.

In certain example embodiments, a method of making an apparatus is provided. First and second substantially parallel spaced apart glass substrates are provided, with the first glass substrate supporting semi-transparent coating thereon. The first and second glass substrates are laminated together via a polymer-based interlayer. The laminated first and second substrates are built into the apparatus. The coating comprises: a reflective metal-inclusive layer comprising Al or Ag formed, directly or indirectly, on the first glass substrate; a silicon oxide inclusive layer formed, directly or indirectly, on the reflective metallic layer; and a titanium oxide inclusive layer formed, directly or indirectly, on the silicon oxide inclusive layer. The metal-inclusive layer is formed so as to reflect incoming light away from the first glass substrate such that substantially less incoming light would be reflected away from the first glass substrate if lighting were provided on a side of the first glass substrate opposite the coating than if no lighting were provided. The coated article has a sheet resistance of at least about 10 ohms/square.

The metal-inclusive layer of certain example embodiments may be connected to a power source so as to heat it (e.g., for defogging purposes). Additionally, the surface of the coated article need not necessarily be conductive.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIG. 5 is a graph showing percent transmission and percent reflectance for a semi-transparent layer stack in accordance with an example embodiment;

FIGS. 6-7 are conceptual drawings of an illustrative medicine cabinet having a display-on-demand mirror according to an example embodiment.

DETAILED DESCRIPTION OF EXAMPLE EMBODIMENTS OF THE INVENTION

Figure 1:
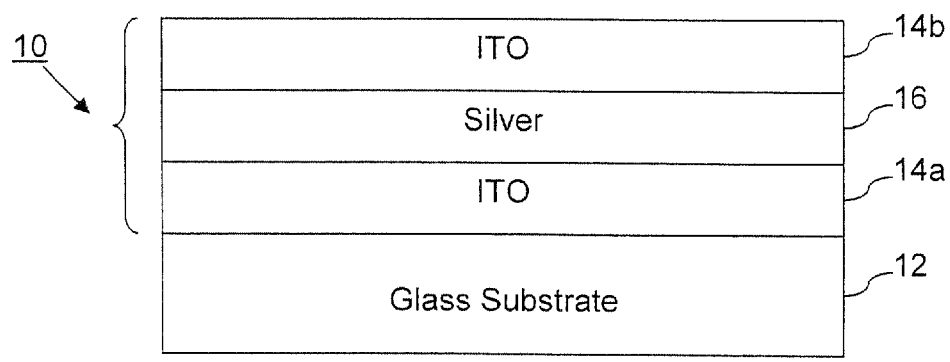
FIG. 1 is an example layer stack for a display-on-demand mirror of the kind typically used in connection with auto-dimming automotive mirror applications.

Referring now more particularly to the accompanying drawings in which like reference numerals indicate like parts/layers throughout the several views.

In certain example embodiments of this invention, a coated article comprising a coating supported by a glass substrate is provided. A reflective metal-inclusive layer (e.g., of or including Al or Ag) is formed, directly or indirectly, on the glass substrate. A silicon oxide inclusive layer is formed, directly or indirectly, on the reflective metallic layer. A titanium oxide inclusive layer is formed, directly or indirectly, on the silicon oxide inclusive layer. The metal-inclusive layer is formed so as to reflect incoming light away from the glass substrate such that substantially less incoming light would be reflected away from the glass substrate if lighting were provided on a side of the glass substrate opposite the coating than if no lighting were provided. The coated article has a sheet resistance of at least about 10 ohms/square. Methods of making the same also are provided.

Figure 2:
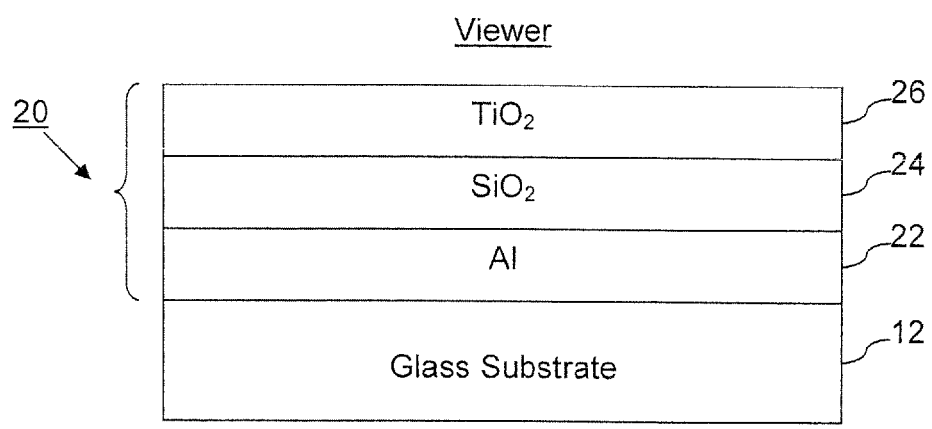
FIG. 2 is a semi-transparent layer stack in accordance with an example embodiment.

FIG. 2 is a semi-transparent layer stack 20 in accordance with an example embodiment. The coating comprises a reflective metallic layer 22 supported by a glass substrate 12. The metallic layer 22 may comprise any suitable metal such as, for example, aluminum or silver. Although silver often is used in mirror-type applications, it will be appreciated that it may be advantageous to use aluminum in certain example embodiments, as it is a fairly inexpensive and durable metal that may sometimes be suitable for mirror-type applications. In certain example embodiments, to improve the durability of a silver-based metallic layer 22, a thin protective layer (e.g., a NiCr or NiCrOx layer) may be deposited over the silver, similar to how Ag layers are protected in low emissivity (low-E) coatings. The reflective metallic layer 22 has a thickness of about 2-24 nm, more preferably 5-12 nm.

A layer of or including silicon oxide 24 (e.g., $SiO_2$ or other suitable stoichiometry) is located, directly or indirectly, on the reflective metallic layer 22. This silicon oxide inclusive layer 24 is provided at a thickness of about 35-135 nm, more preferably 70-90 nm. A layer of or including titanium oxide 26 (e.g., $TiO_2$ or other suitable stoichiometry) is located, directly or indirectly, on the silicon oxide inclusive layer 24. This titanium oxide inclusive layer 26 is provided at a thickness of about 20-90 nm, more preferably 40-60 nm.

Although certain example thicknesses of the silicon oxide inclusive layer 24 and the titanium oxide inclusive layer 26 have been identified, it will be appreciated that the present invention is not limited to such thicknesses. Indeed, the thicknesses of the silicon oxide inclusive layer 24 and the titanium oxide inclusive layer 26 may be varied, individually or together, in certain example embodiments so as to help control to desired predetermined levels the percent transmission and percent reflectance of the overall layer stack 20. Similarly, the indices of refraction for the silicon oxide inclusive layer 24 and the titanium oxide inclusive layer 26 may be varied, individually or together, in certain example embodiments so as to help control to desired predetermined levels the percent transmission and percent reflectance of the overall layer stack 20.

The silicon oxide inclusive layer 24 and the titanium oxide inclusive layer 26, individually or together, also may help to protect the underlying reflective metallic layer 22. For example, these oxide layers, individually or collectively, may help to protect an aluminum- or silver-based (or other metal-based) metallic layer 22 from corrosion. The layer stack 20 comprising metallic layer 22, silicon oxide inclusive layer 24, and titanium oxide inclusive layer 26 also may be mechanically durable. For example, the layer stack 20 preferably passes a brush test of 500 strokes, more preferably 750 strokes, and still more preferably 1000 strokes. The chemical and mechanical protective features of certain example embodiments is advantageous in that the layer stack 20 often will not be protected in a hermetically sealed environment as are conventional display-on-demand mirrors and thus will be exposed to the environment and otherwise subject to damage.

In certain example embodiments, the coating may be self-heated, e.g., via an electrical power supply. It will be appreciated that the metallic layer 22 is conductive. That is, the aluminum, silver, or other metal included in the metallic layer 22 is conductive. DC voltage may be applied to this layer (e.g., via a mini-bus bar connection, continuous or patterned leads that may be concealed by an outer frame of the assembly, or via any other suitable technique). The metallic layer 22 will act as a resistor and heat up. By heating up the metallic layer 22, an overall assembly into which the glass substrate 12 having the coating 20 may be able to defog itself in certain conditions.

The metallic layer 22, the silicon oxide inclusive layer 24, and the titanium oxide inclusive layer 26 may be formed via any suitable technique. For example, some or all of such layers may be formed via a vacuum deposition technique such as, for example, sputtering, electron-beam deposition, ion beam deposition, etc. In certain example embodiments, an aluminum metallic layer may be formed by sputter coating from an aluminum target in an argon gas rich environment. In certain example embodiments, silicon oxide (e.g., $SiO_2$ or other suitable stoichiometry) and titanium oxide (e.g., $TiO_2$ or other suitable stoichiometry) layers may be formed by sputter coating from appropriate targets in an environment comprising argon and oxygen. In certain example embodiments, some or all of the layers may be wet-applied (e.g., by spray, sol-gel, or other techniques). For example, it is possible in certain example embodiments to wet-apply silicon oxide (e.g., $SiO_2$ or other suitable stoichiometry) and titanium oxide (e.g., $TiO_2$ or other suitable stoichiometry) layers. However, it sometimes may be difficult to wet-apply a metal layer, e.g., because it is difficult to form such layers substantially continuously and at a substantially uniform thickness. Thus, in certain example embodiments, it is possible to sputter-coat a metallic layer and wet-apply silicon oxide (e.g., $SiO_2$ or other suitable stoichiometry) and titanium oxide (e.g., $TiO_2$ or other suitable stoichiometry) layers, directly or indirectly, thereon.

As will be appreciated from the description of the layer stack 20 above, unlike prior art display-on-demand mirrors, the surface layer of certain example embodiments (e.g., the layer farthest from the substrate 12) does not necessarily have to be conductive. Indeed, the coating 20 has a sheet resistance of greater than about 10 ohms/sq., more preferably about 10-20 ohms/sq., or even higher.

The semi-transparent layer stack of certain example embodiments may be the same as or similar to first surface mirrors (FSMs) used in connection with projection televisions (PTVs), copiers, scanners, bar code readers, overhead projectors, and/or the like. Such techniques are disclosed in U.S. Pat. No. 7,276,289 and application Ser. Nos. 11/523,092 and Ser. No. 11/657,120, the entire contents of each of which is hereby incorporated herein by reference. The same of different metal oxide or non-metal oxide layers may be used in certain example embodiments of this invention. Additionally, the metal layer (which may be aluminum) may be graded in certain example embodiments of this invention.

Figure 3:
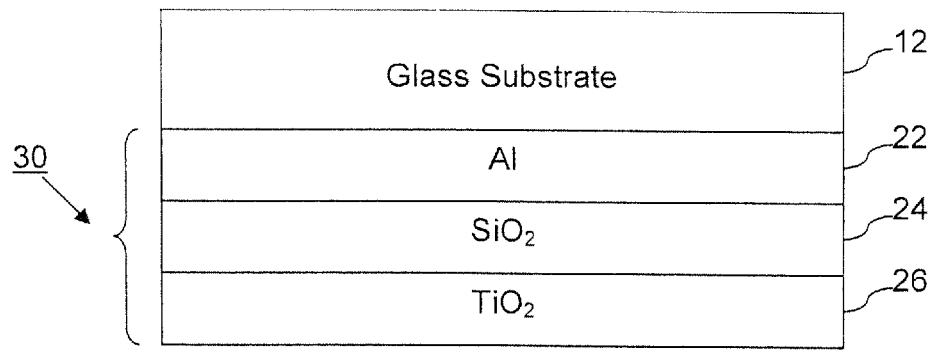
FIG. 3 is another semi-transparent layer stack in accordance with an example embodiment.

The layer stack 20 shown in FIG. 2 is placed on the first surface of the glass substrate 12. In other words, the layer stack 20 is located closest to the viewer. However, certain exemplary embodiments may place a similar layer stack on the second surface of the glass substrate 12. In other words, a similar layer stack to the layer stack 20 shown in FIG. 2 may be supported by a side of the glass substrate opposite to the viewer. For example, FIG. 3 is another semi-transparent layer stack 30 in accordance with an example embodiment. The layer stack 30 of FIG. 3 is similar to the layer stack 20 shown in FIG. 2. That is, the layer stack 30 comprises a metallic layer 22, a silicon oxide inclusive layer 24, and a titanium oxide inclusive layer 26 supported, in this order, by the glass substrate 12. However, unlike the arrangement shown in FIG. 2, the layer stack 30 of FIG. 3 is located on the glass substrate 12 on its second surface (opposite the viewer).

Figure 4:
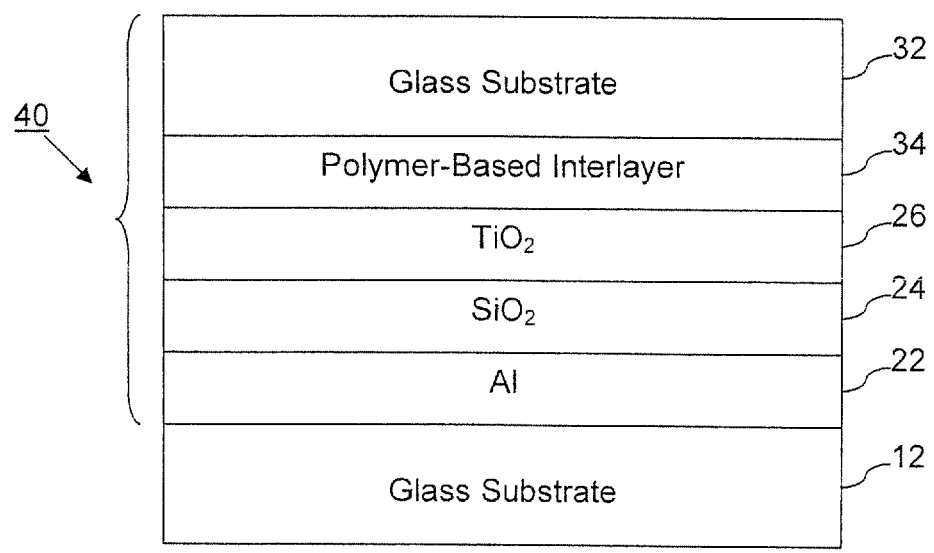
FIG. 4 is a semi-transparent layer stack including a second glass substrate in accordance with an example embodiment.

Optionally, a second glass substrate may be laminated, e.g., using a polymer-based interlayer, to the FIG. 2 or FIG. 3 embodiment. It will be appreciated that such an arrangement would provide yet further protection (e.g., chemical and/or mechanical) for the underlying layer stack. For example, FIG. 4 is a semi-transparent layer stack 40 including a second glass substrate in accordance with an example embodiment. FIG. 4 is similar to FIG. 2, except that the FIG. 4 embodiment also includes a second substrate 32 laminated to the first glass substrate 12 via a polymer-based interlayer 34. The polymer-based interlayer 34 may comprise any suitable laminating material including, for example, polyvinyl butyral (PVB), ethylvinyl acetate (EVA), etc. It will be appreciated that similar additional materials may be used in connection with the FIG. 3 embodiment, e.g., such that the polymer-based interlayer 34 and the second glass substrate 34 are located on a side of the first glass substrate 12 opposite the viewer.

The percent visible transmission and percent reflectance of light in the visible spectrum (e.g., light having a wavelength from about 400 nm to about 700 nm) may be selected based at least in part on the type of application in which the semi-transparent coating will be used. For example, for automotive applications, reflectance preferably will be at least about 50%, more preferably at least about 60%, still more preferably at least about 70%, or even higher. For medicine cabinet or vanity mirror applications, the percent reflectance may be higher, and preferably will be at least about 60%, more preferably at least about 70%, still more preferably at least about 80%, or even higher. It will be appreciated that the percent visible transmission and the percent reflectance may add up to a number close to 100%. Thus, for automotive applications, visible transmission preferably will be below about 50%, more preferably below about 40%, still more preferably below about 30%, or even lower. For medicine cabinet or vanity mirror applications, the visible transmission may be higher, and preferably will be below about 40%, more preferably below about 30%, still more preferably below about 20%, or even lower.

In line with this description, FIG. 5 is a graph showing percent transmission and percent reflectance for a semi-transparent layer stack in accordance with an example embodiment. The date in the FIG. 5 graph has been modeled so as to be indicative of the percent transmission and percent reflection of the FIG. 4 example embodiment. As can be seen from FIG. 5, the coating design would have a reflectance of at least about 65% in the visible spectrum, as well as a visible transmission of about 20% or lower.

As noted above, the semi-transparent mirrors of certain exemplary embodiments may be used in a variety of applications. For example, the semi-transparent mirrors of certain exemplary embodiments may be used in connection with bathroom vanity mirrors, medicine cabinet mirrors, refrigerator door mirrors, prismatic automotive rear-view mirrors, etc. Conceptual drawings of an illustrative medicine cabinet having a display-on-demand mirror according to an example embodiment are shown in FIGS. 6 and 7.

The semi-transparent mirrors may operate as, or similar to, the following description, which is made in connection with the medicine cabinet 60 shown in FIGS. 6 and 7. Lights are disposed and outside the cabinet 60 (not shown). When the light inside the cabinet 60 is turned off, it is difficult to see through the mirrored panel 62 inside the medicine cabinet 60. This result occurs, in part, because the visible transmission of the mirrored panel 62 is so low (e.g., as falling in the ranges described above), and light from outside the cabinet 60 essentially would have to pass through the mirrored substrate twice. Thus, for example, if the percent visible transmission of the mirrored panel 62 were at 20%, the mirrored panel 62 effectively would reduce all but about 4% of visible light from reaching a viewer (e.g., 20% visible transmission through the first surface of the mirrored panel 62×20% visible transmission through the second surface of the mirrored panel 62).

On the other hand, when the light inside the cabinet 60 is turned on, the contents 70 thereof is visible through the mirrored panel 62. Because the intensity of the light inside the cabinet is relatively strong, the second surface reflection is reduced (and sometimes even eliminated). Indeed, it will be appreciated that the total visible transmission is directly proportional to the intensity of the inside light. Furthermore, as noted above, the intensity of the light inside the cabinet is relatively strong, with the strength being sufficient to overcome the contrast ratio and enable a viewer to see the contents 70 of the cabinet 60 through the mirrored panel 62. Thus, the visible transmission is increased, at least compared to when a light inside the cabinet is not turned on.

Furthermore, the medicine cabinet may be self-defogging. For example, the reflective metal-inclusive layer of the panel 62 may be connected to an external power source so as to make the metal-inclusive layer selectively heatable. In this and/or other ways, the metal-inclusive layer may be selectively heatable, e.g., to reduce the presence of fog on at least a portion of the apparatus.

While the materials shown for the various layers in the drawings are preferred materials in certain example embodiments of this invention, they are not intended to be limited unless expressly claimed. Other materials may be used to replace materials shown in the drawings in alternative example embodiments of this invention. Moreover, certain layers may be removed, and other layers added, in alternative embodiments of this invention. Likewise, the illustrated thicknesses also are not intended to be limiting unless expressly claimed.

Additionally, although the layer system or coating may be said to be "on" or "supported by" a substrate or layer (directly or indirectly), other layer(s) may be provided therebetween. Thus, for example, a coating or layer may be considered "on" and "supported by" a layer or substrate even if one or more other layer(s) are provided therebetween. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention. Thus, the use of the word "on" herein is not limited to being in direct contact with.

While the invention has been described in connection with what is presently considered to be the most practical and preferred embodiment, it is to be understood that the invention is not to he limited to the disclosed embodiment, but on the contrary, is intended to cover various modifications and equivalent arrangements included within the spirit and scope of the appended claims.

What is claimed is:

1. A method of making a coated article comprising a coating supported by a glass substrate to form a semi-transparent mirror, the method comprising:
   providing a glass substrate;
   forming a reflective metal-inclusive layer, directly or indirectly, on the glass substrate;
   forming a silicon oxide inclusive layer, directly or indirectly, on the reflective metallic layer; and
   forming a titanium oxide inclusive layer, directly or indirectly, on the silicon oxide inclusive layer,
   wherein the metal-inclusive layer is formed so as to reflect incoming light away from the glass substrate such that substantially less incoming light would be reflected away from the glass substrate if lighting were provided on a side of the glass substrate opposite the coating than if no lighting were provided, and so that a percentage of reflectance of incoming light by the mirror is from about 60 to 80% and a percentage of visible transmission through the mirror is from about 20 to 40%,
   wherein the coated article has a sheet resistance of at least about 10 ohms/square, wherein
   the metal-inclusuve layer comprises aluminum and is provided at a thickness of about 2-7 nm,
   wherein the silicon oxide inclusive layer has a thickness of about 80-90 nm, and
   wherein the titanium oxide inclusive layer has a thickness of about 50-60 nm.

2. The method of claim 1, wherein
   the metal-inclusive layer comprises aluminum or silver.

3. The method of claim 1, further comprising connecting the reflective metal-inclusive layer to an external power source so as to make the metal-inclusive layer selectively heatable.

4. The method claim 1, further comprising:
   providing a second substrate; and
   laminating the second substrate to the glass substrate via a polymer-based interlayer so that the coating is located therebetween.

5. A method of making an apparatus, the method comprising:
   providing first and second substantially parallel spaced apart glass substrates, the first glass substrate supporting semi-transparent coating thereon;
   laminating together the first and second glass substrates via a polymer-based interlayer; and
   building the laminated first and second substrates into the apparatus,
   wherein the coating comprises:
      a reflective metal-inclusive layer comprising Al or Ag formed, directly or indirectly, on the first glass substrate;
      a silicon oxide inclusive layer formed, directly or indirectly, on the reflective metallic layer; and
      a titanium oxide inclusive layer formed, directly or indirectly, on the silicon oxide inclusive layer;
      wherein the metal-inclusive layer is formed so as to reflect incoming light away from the first glass substrate such that substantially less incoming light would be reflected away from the first glass substrate if lighting were provided on a side of the first glass substrate opposite the coating than if no lighting were provided, and so that a percentage of reflectance of incoming light by the coating is from about 60 to 80% and a percentage of visible transmission through the coating is from about 20 to 40%,
   wherein the coated article has a sheet resistance of at least about 10 ohms/square, wherein
   the metal-inclusive layer comprises aluminum and is provided at a thickness of about 2-7 nm,
   wherein the silicon oxide inclusive layer has a thickness of about 80-90 nm, and
   wherein the titanium oxide inclusive layer has a thickness of about 50-60 nm.

6. The method of claim 5, wherein
   each of the metal-inclusive layer, the silicon oxide inclusive layer, and the titanium oxide inclusive layer is formed via sputtering.

7. The method of claim 5, further comprising connecting the reflective metal-inclusive layer to an external power source so as to make the metal-inclusive layer selectively heatable.

8. The method of claim 7, wherein
   the metal-inclusive layer selectively heatable to reduce the presence of fog on at least a portion of the apparatus.

* * * * *